United States Patent
Kamma

(10) Patent No.: US 9,591,092 B2
(45) Date of Patent: Mar. 7, 2017

(54) RELAYING DEVICE, IMAGE PROCESSING DEVICE, AND SYSTEM COMPRISING IMAGE PROCESSING DEVICE, RELAYING DEVICE AND SERVICE SERVER

(71) Applicant: BROTHER KOGYO KABUSHIKI KAISHA, Nagoya-shi, Aichi-ken (JP)

(72) Inventor: Yui Kamma, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 260 days.

(21) Appl. No.: 14/272,977

(22) Filed: May 8, 2014

(65) Prior Publication Data

US 2014/0337413 A1  Nov. 13, 2014

(30) Foreign Application Priority Data

May 10, 2013  (JP) ................................. 2013-100087

(51) Int. Cl.
*G06F 15/16* (2006.01)
*H04L 29/08* (2006.01)

(52) U.S. Cl.
CPC .......... *H04L 67/2804* (2013.01); *H04L 67/06* (2013.01)

(58) Field of Classification Search
USPC ........ 709/203, 231, 238, 246, 242, 243, 244
See application file for complete search history.

(56) References Cited

U.S. PATENT DOCUMENTS

| | | | |
|---|---|---|---|
| 2007/0133064 A1 | 6/2007 | Itogawa et al. | |
| 2007/0203748 A1* | 8/2007 | Rothpearl | G06F 17/30265 705/2 |
| 2011/0021178 A1* | 1/2011 | Balasaygun | G10L 17/26 455/413 |
| 2012/0072204 A1* | 3/2012 | Nasri | G06F 17/2229 704/9 |

FOREIGN PATENT DOCUMENTS

JP  2007-188479 A  7/2007

* cited by examiner

*Primary Examiner* — Lan-Dai T Truong
(74) *Attorney, Agent, or Firm* — Merchant & Gould P.C.

(57) ABSTRACT

A relaying device may comprise a network interface configured to connect with a network; a processor coupled to the network interface; and a memory configured to store tagging rule information and instructions. The tagging rule information may concern a tagging rule relating to tag information for a service server capable of storing at least one tag information in association with stored contents data. The relaying may receive designated tag information designated by an image processing device. The relaying device may determine whether the received designated tag information conforms to the tagging rule. Only when it is determined that the received designated tag information does not conform to the tagging rule, the relaying may convert the received designated tag information into converted tag information. The converted tag information may conform to the tagging rule. The relaying may transmit, via the network interface, the converted tag information to the service server.

13 Claims, 11 Drawing Sheets

| 800 Service Name | Tagging Rule | | | | |
|---|---|---|---|---|---|
| | Space (801) | , (Comma) (802) | Distinguish between Upper-Case and Lower-Case Letters (803) | -(Hyphen) (804) | Initial, Final Space (805) |
| Service A | Recognize as "Space" | Recognize as "Split" | Execute | Available | Not Available (Ignored) |
| Service B | Recognize as "Split" | Erase Symbol String after "," | Execute | Not Available | Available |
| Service C | Recognize as "Split" | Recognize as "Split" | Do not Execute | Available | Available |
| ... | ... | ... | ... | ... | ... |

FIG. 10

| Identification Number | Conversion Condition | Conversion Contents |
|---|---|---|
| 1 | Case That Service Recognizing Space as "Split" is Included | ○○□○○ ⇒ "○○""○○" (Note: □ Indicates Space) |
| 2 | Case That Service Erasing Symbol String After "," is Included | ○○, ○○ ⇒ "○○""○○" |
| 3 | Case That Service not Distinguishing Between Upper-Case And Lower-Case Letters is Included | Abc ⇒ ABC |
| 4 | Case That Service Unable to Use - (Hyphen) is Included | "-" (Hyphen) ⇒ _ (Underbar) |
| 5 | Case That Service Unable to Use Initial, Final Space is Included | □○○○○□ ⇒ ○○○ (Note: □ Indicates Space) |
| ... | ... | ... |

FIG. 11

| Folder Name | File Name | Extension | Tag Information |
|---|---|---|---|
| \\server\root\user001 | note1234 | .jpg | Meeting Mintes_C |
| \\server\root\user001 | information05 | .pdf | Material |
| \\server\root\user001 | camera_01 | .jpg | Travel |
| \\server\root\user001 | camera_02 | .png | Pet |

RELAYING DEVICE, IMAGE PROCESSING DEVICE, AND SYSTEM COMPRISING IMAGE PROCESSING DEVICE, RELAYING DEVICE AND SERVICE SERVER

CROSS-REFERENCE TO RELATED APPLICATIONS

This application claims priority to Japanese Patent Application No. 2013-100087, filed on May 10, 2013, the contents of which are hereby incorporated by reference into the present application.

TECHNICAL FIELD

In the present specification, a relaying device is taught that is capable of communicating with a service which stores tag information in association with a file.

DESCRIPTION OF RELATED ART

In the related art, a technique of registering an image file or a document file in a file management device in association with tags when storing the file in the file management device is known. A technique of displaying candidates for tags, created by a scan image management server as the file management device, on an MFP, and registering tags designated by a user among the displayed candidates for tags in the scan image management server in association with a scan image scanned by the MFP is known. In this technique, the displayed candidates for tags are tags stored in advance in the scan image management server, tags correlated with the scan images stored in the scan image management server, and the like.

SUMMARY

A service server used in a storage service which stores uploaded contents data is capable of storing tag information conforming to a predetermined rule in association with contents data. Thus, it may be disadvantageous if the service server is instructed to store tag information not conforming to the predetermined rule in association with the contents data.

In one aspect of the teachings disclosed herein, a relaying device may be provided. The relaying device may comprise a network interface configured to connect with a network; a processor coupled to the network interface; and a memory configured to store tagging rule information and instructions. The tagging rule information may concern a tagging rule relating to tag information for a service server capable of storing at least one tag information in association with stored contents data. The instructions, when executed by the processor, may cause the relaying device to perform receiving, via the network interface, designated tag information designated by an image processing device. The instructions may cause the relaying device to perform determining whether the received designated tag information conforms to the tagging rule. Only when it is determined that the received designated tag information does not conform to the tagging rule, The instructions may cause the relaying device to perform converting the received designated tag information into converted tag information. The converted tag information may conform to the tagging rule. The instructions may cause the relaying device to perform transmitting, via the network interface, the converted tag information to the service server.

BRIEF DESCRIPTION OF DRAWINGS

FIG. 9 shows an example of a tag table; FIG. 10 shows an example of a conversion table; FIG. 11 is a diagram showing an example of data associated with electronic data.

EMBODIMENT

Hereinafter, exemplary embodiments of the present invention will be described with reference to the accompanying drawings. The drawings to be referred to are used for explaining technical features usable in the present invention. Configurations of devices, flowcharts of various processes, and the like to be described below are simple explanation examples. They are not intended to limit the present invention.

<Outline of Service Cooperation System 10>

Figure 1:
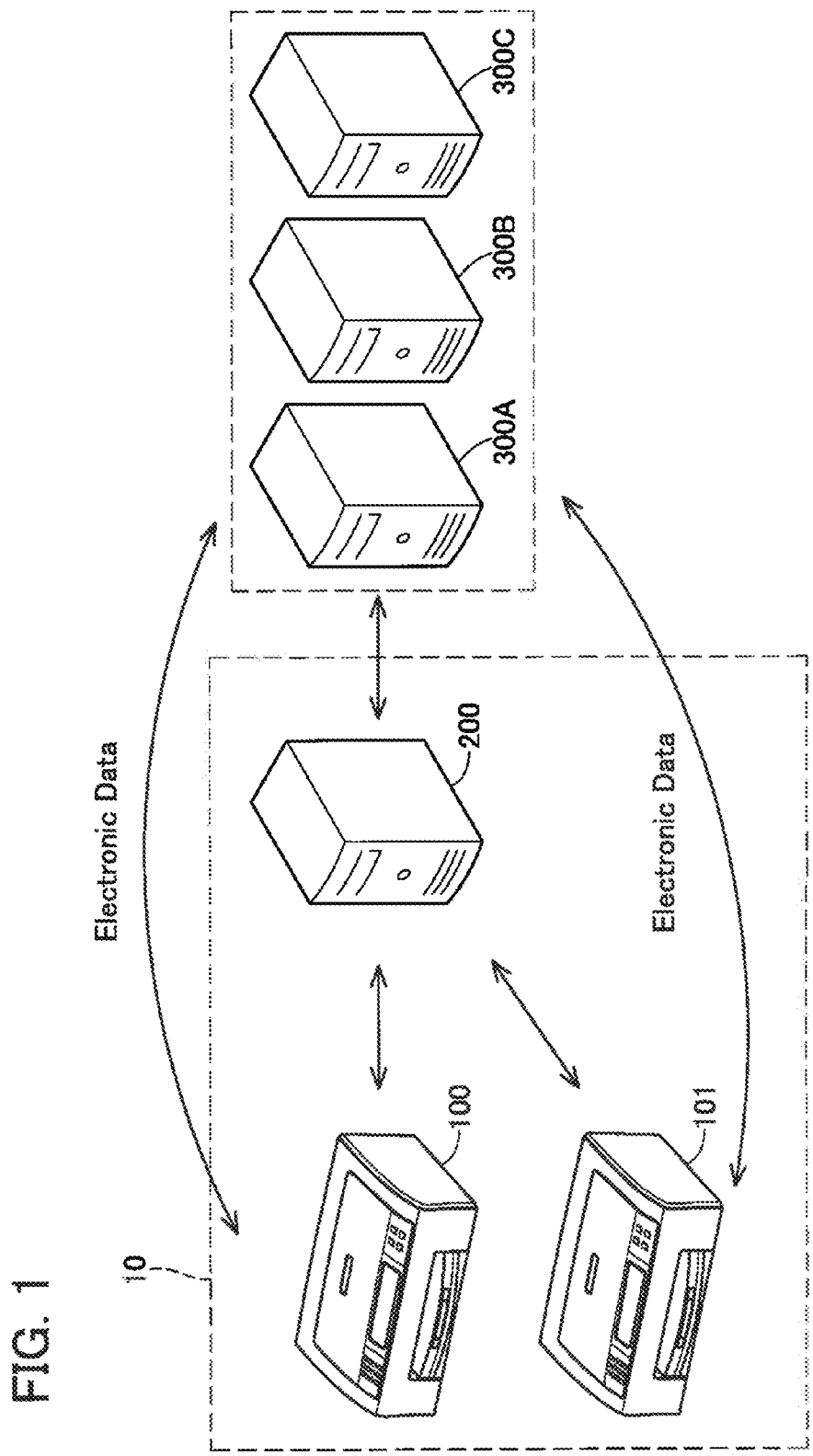
FIG. 1 shows an outline of a service cooperation system according to an embodiment.

An outline of a service cooperation system 10 will be described with reference to FIG. 1. The service cooperation system 10 includes multi-function devices 100 and 101, and a relaying device 200. The relaying device 200 is connected to the multi-function devices 100 and 101 via a network. The service cooperation system 10 can perform upload or download of an electronic data in an electronic-data storing service which a service provider provides. When a plurality of users A and B is present, the electronic-data storing service can provide a storage area to each of the users A and B. The users A and B can be identified by a user ID or the like used when the user logs into the electronic-data storing service.

The electronic-data storing service is a service provided by a service providing apparatus 300 installed on the Internet by a service provider. Alternatively, the electronic-data storing service is a service provided by a collection of devices on the Internet including at least the service providing apparatus 300. In the present specification the "service providing apparatus" may be described in short as "service". The electronic-data storing service performs HTTP or HTTPS communication with out-of-service terminals connected to the Internet, and stores electronic data uploaded to the out-of-service terminals. An example of the electronic data is image data having various types of format such as JPG, GIF, BMP, or document data having various types of format such as PDF (referred to as Portable Document Format), DOC (an example of a document creation file), XLS (an example of a spreadsheet file), PPT (an example of a presentation file). The service providing apparatus 300 may have the function of a known Web server. The service providing apparatus 300 may have the function of a storage server that receives electronic data from a communication server that performs HTTP or HTTPS communication with out-of-service terminals and stores the electronic data. The service providing apparatus 300 may be a large-sized computer device and may be a personal computer.

FIG. 11 shows an example of electronic data that the user A stores in a service providing apparatus 300A. Data such as a folder name 601, a file name 602, an extension 603, and tag information 604 can be added to each of a plurality of electronic data. The folder name 601 is information that indicates a storage location of electronic data. Thus, only one of the folder names 601 can be added to one electronic data. Further, the folder name 601 is uniquely determined when electronic data is stored. The file name 602 is information that identifies respective electronic data. Thus, the same file name 602 cannot be added to a plurality of electronic data stored in the same folder. Moreover, a plurality of file names 602 cannot be added to one electronic data. The extension 603 is information that indicates the format of electronic data. Thus, a plurality of extensions 603 cannot be added to one electronic data. Further, the extension 603 is uniquely determined by the format of electronic data when the electronic data is created. The tag information 604 is data that can be added to electronic data separately from the data such as the folder name 601, the file name 602, and the extension 603. The user of the electronic-data storing service can determine tag information to be used as a keyword regardless of the file name, format, and storage location of the electronic data. The tag information is data that has characteristics different from the other data that can be added to electronic data. That is, one tag information can be added to a plurality of electronic data. Moreover, a plurality of tag information can be added to one electronic data.

The advantages of tag information will be described with reference to FIG. 11. When a user designates a search keyword "meeting," the user can retrieve electronic data of which the file name 602 is "note1234" and to which tag information 604 "Meeting Minutes_C" is added. That is, the tag information 604 added to electronic data can be used as a keyword for retrieving the electronic data.

Moreover, the user A can upload electronic data to a storage area for the user A of the service providing apparatus 300A by using one of the plurality of multi-function devices 100 and 101. In this case, the user A needs to log into the service providing apparatus 300A from one of the respective multi-function devices 100 and 101.

An example of the multi-function device 100 is a small-sized digital combined machine. The multi-function device 100 has a print function, a scanner function, a fax function, a copy function, and a function of executing write and read processes on external storage media. A user of the multi-function device 100 can read images by using the scanner function of the multi-function device 100 and upload electronic data of the read images in the electronic-data storing service. Further, the user of the multi-function device 100 can download electronic data in the electronic-data storing service, and print the downloaded electronic data by the print function of the multi-function device 100. The small-sized digital combined machine is also an example of the multi-function device 101.

The multi-function device 100 uploads or downloads electronic data in cooperation with the relaying device 200. The multi-function device 100 obtains URLs in the electronic-data storing service through the relaying device 200. The URLs include an upload destination URL which is an URL of an upload destination of an electronic data to the electronic-data storing service, an electronic-data URL which is a URL of an electronic data to be downloaded from the electronic-data storing service, and so on. However, in order to transmit or receive binary data of an electronic data having a large amount of data, the multi-function devices 100 and 101 communicate directly with the electronic-data storing service without using the relaying device 200. Therefore, according to the service cooperation system 10, it is possible to suppress an amount of data passing through the relaying device 200. Further, it is possible to suppress a load on the relaying device 200.

The relaying device 200 may be a known apparatus having a server function. The relaying device 200 may also be prepared by a maker of the multi-function device 100. Alternatively, it can also be considered to use, as the relaying device 200, a known rental server or a virtual machine which functions as a server in cooperation with a plurality of physical apparatuses. In this case, the operational cost of the relaying device 200 changes depending to the amount of data passing through the relaying device 200 and a load on the relaying device 200 for processing. Therefore, in the case of using a rental server or a virtual machine, the operational cost of the relaying device 200 can be suppressed by reducing the amount of data passing through the relaying device 200 or reducing the load on the relaying device 200. Further, even in a case that the relaying device 200 is prepared by the maker, since the relaying device 200 does not need high processing performance, the equipment investment for the relaying device can be suppressed.

<Hardware Configuration of Service Cooperation System 10>

Figure 2:
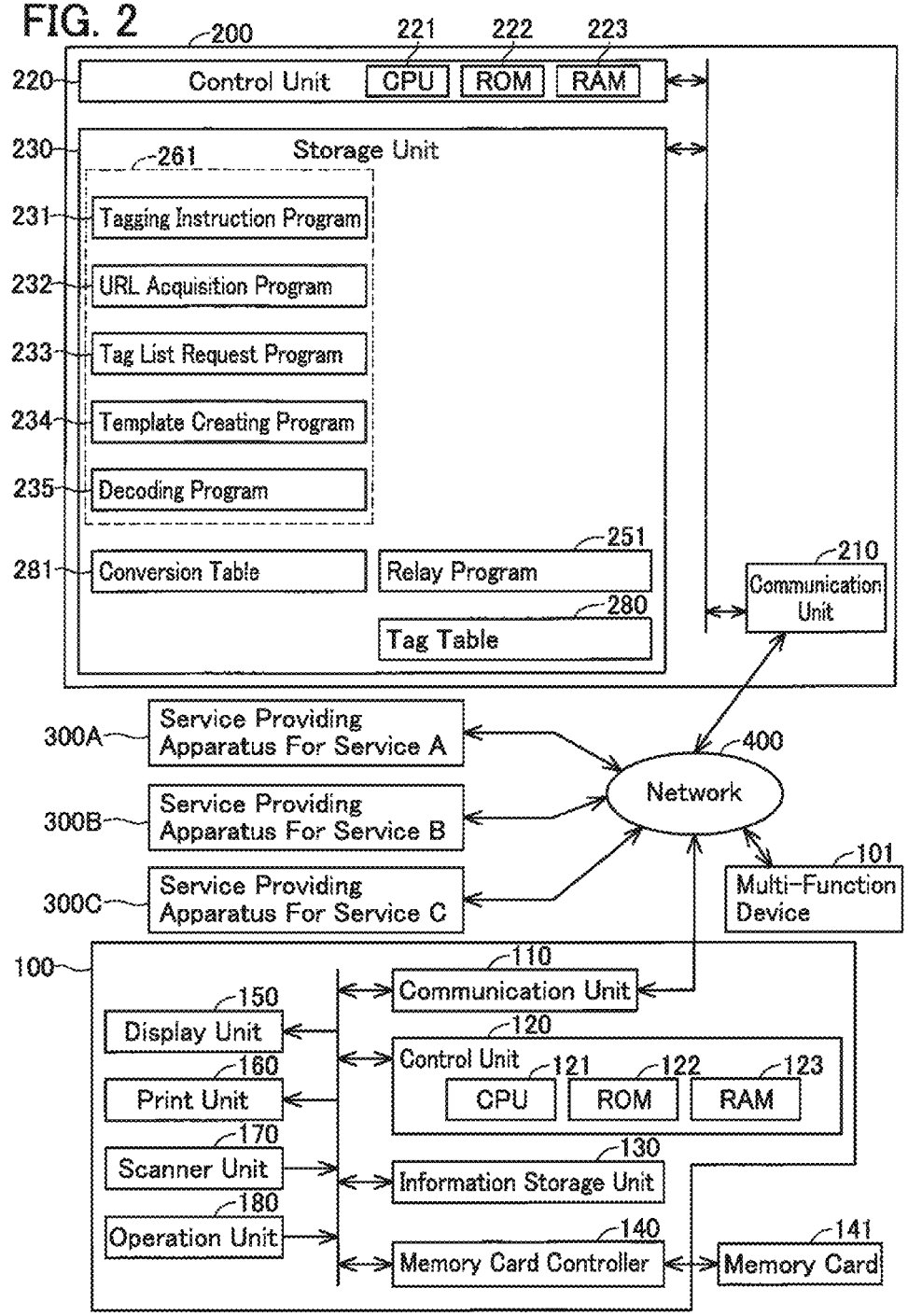
FIG. 2 shows a hardware configuration of the service cooperation system.
Figure 3:
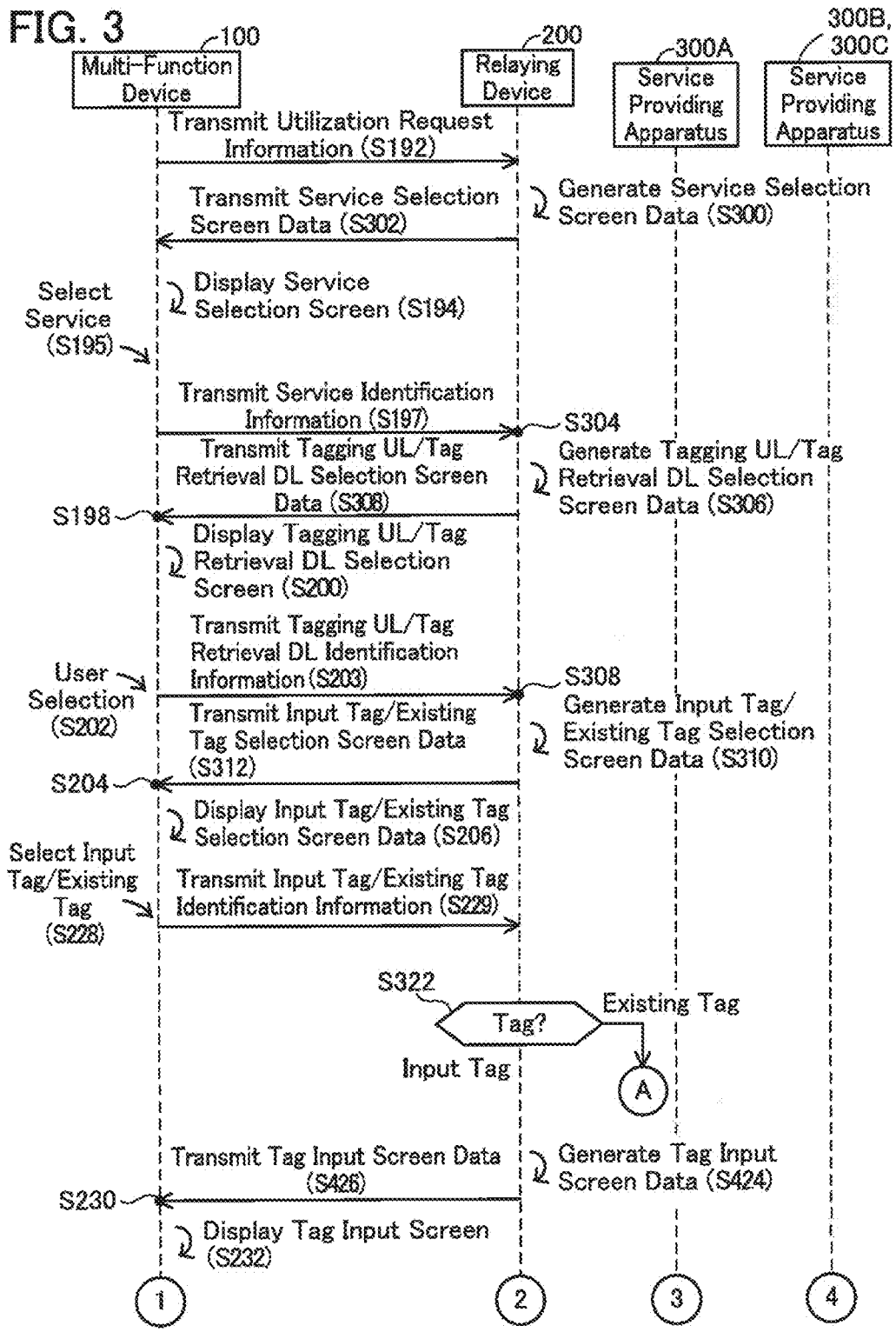
FIG. 3 is a sequence diagram for explaining an operation example of the service cooperation system.

A hardware configuration of the service cooperation system 10 will be described with reference to FIG. 2. The following description will be made on assumption that the service cooperation system 10 performs cooperation of three electronic-data storing services, that is, a service A, a service B and a service C. In the following description, a service providing apparatus 300 for the service A is referred to as a service providing apparatus 300A. Also, a service providing apparatus 300 for the service B is referred to as a service providing apparatus 300B. Also, a service providing apparatus 300 for the service C is referred to as a service providing apparatus 300C. In a case that it is unnecessary to particularly distinguish both sides from each other, the service providing apparatus 300A and the service providing apparatus 300B are generally referred to as the service providing apparatus 300. The multi-function devices 100 and 101, the relaying device 200, the service providing apparatus 300A, the service providing apparatus 300B, and the service providing apparatus 300C are connected to one another through a network 400. As the network 400, for example, an Internet network can be used. The multi-function devices 100 and 101, the relaying device 200, and the service providing apparatus 300 perform data transmission and reception with one another on the basis of HTTP.

<Hardware Configuration of Multi-Function Device>

The multi-function device 100 includes a communication unit 110, a control unit 120, an information storage unit 130, a memory card controller 140, a display unit 150, a print unit 160, a scanner unit 170, and an operation unit 180. The communication unit 110 is a device for performing communication with other devices connected to the network. As the communication unit 110, a known network card can be used. The control unit 120 includes a CPU 121, and a ROM 122 and RAM 123 connected to the CPU 121. The CPU 121 controls the operation of the multi-function device 100 according to programs stored in the ROM 122. The RAM 123 is a storage device for temporarily storing various types of data.

As with the information storage unit 230, the information storage unit 130 may be a computer readable storage medium.

The information storage unit 130 is a non-volatile storage device such as a NAND-type flash memory. The information storage unit 130 stores various types of setting information such as user identification information for identifying a user of the multi-function device 100. Moreover, the information storage unit 130 stores the predetermined character string. The predetermined character string may be stored in advance by the manufacturer of the multi-function device 100. When a plurality of users shares one multi-function device 100, the user identification information of a logged-in user may be stored in the information storage unit 130.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic data having a predetermined format is stored.

The display unit 150 is a display device having a display such as a known LCD. The display unit 150 displays predetermined information such as a menu item selection screen, on the basis of an instruction form the control unit 120. The print unit 160 is a device which prints images according to an instruction of the control unit 120. The scanner unit 170 is a device that reads images recorded on a sheet set by a user. The scanner unit 170 reads images according to an instruction of the control unit 120. The operation unit 180 is a device that includes a plurality of operation buttons operable by the user, and transmits signals based on the pushing operation of the user to the control unit 120. The user can input a desired instruction by operating the operation unit 180. The multi-function device 101 has the same hardware configuration as the multi-function device 100, and description thereof will not be provided.

<Hardware Configuration of Relaying Device 200>

The description of the present exemplary embodiment will be made on assumption that the relaying device 200 is a physically existing server. Incidentally, the relaying device 200 may be a virtual machine which functions as a server in cooperation with a plurality of physical devices as described above.

The relaying device 200 includes a communication unit 210, a control unit 220, and an information storage unit 230. The communication unit 210 is a device for performing communication with other devices connected to the network. As the communication unit 210, a known network card can be used. The control unit 220 includes a CPU 221, and a ROM 222 and RAM 223 connected to the CPU 221. The CPU 221 controls the operation of the relaying device 200 according to programs stored in the ROM 222 and the information storage unit 230. The RAM 223 is a storage device for temporarily storing various types of data.

The information storage unit 230 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium. The information storage unit 230 stores a program group 261 which is programs for the services A to C. The program group 261 includes a plurality of software modules that includes a tagging instruction program 231, a URL acquisition program 232, a tag list request program 233, a template creating program 234, and a decoding program 235. The tagging instruction program 231 is a program for transmitting tagging instruction information described later to the service providing apparatuses 300A to 300C using open APIs of the services A to C. The URL acquisition program 232 is a program for transmitting UL information request information described later to the service providing apparatuses 300A to 300C using open APIs of the services A to C. The UL information request information is a word coined in the present exemplary embodiment, representing information for requesting information necessary for uploading. The tag list request program 233 is a program for transmitting tag list request information described later to the service providing apparatuses 300A to 300C using open APIs of the service A to C. The template creating program 234 is a program for creating a template for an upload message which is a message used when uploading electronic data to the services A to C. The decoding program 235 is a program for decoding a response message from the service providing apparatuses 300A to 300C.

Further, the information storage unit 230 stores a tag table 280 and a conversion table 281. The tag table 280 is a database for recording tagging rules for each of services A to C. The tagging rules are rules relating to the tag information, and are rules specific to the service. The tagging rules can be determined independently for each service. In other words, the tagging rules are rules for determining what kind of tag information can be used for a service. Since tag information which does not conform to the tagging rule cannnot be used for the service, the tag information will be converted so that the tag information can be used for the service. FIG. 9 shows an example of the tag table 280. The tag table 280 stores a service name 800 and tagging rules 801 to 805. The service name 800 is information that identifies the type of service.

The tagging rule 801 is a rule defined by a space. That is, service A is operated under a rule that a space is to be treated as a space. On the other hand, services B and C are operated under a rule that, if a specific symbol "space" is included in a symbol string that includes a plurality of symbols and is indicated by tag information, the symbol string is split before and after the specific symbol.

The tagging rule 802 is a rule defined by a comma. That is, services A and C are operated under a rule in which a symbol string split by a comma is treated as split into different symbol strings. On the other hand, service B is operated under a rule in which if a specific symbol ", (called 'comma')" is included in a symbol string that includes a plurality of symbols and is indicated by tag information, the symbol string after the specific symbol is erased.

The tagging rule 803 is a rule relating to upper-case and lower-case letters. That is, services A and B are operated under a rule that distinguishes between upper-case letters and lower-case letters of the alphabet, etc. On the other hand, service C is operated under a rule that does not distinguish between upper-case letters and lower-case letters of the alphabet, etc.

The tagging rules 804 and 805 are rules relating to "-(called 'hyphen')". That is, services A and C are operated under a rule that allows a hyphen to be used. On the other hand, service B is operated under a rule that does not allow a hyphen to be used.

The tagging rule 805 is a rule relating to a "space" present in the initial and final position of a symbol string included in the tag information. That is, services B and C are operated under a rule that enables these spaces to be used. On the other hand, service A is operated under a rule to ignore these spaces.

The conversion table 281 is a database for recording conversion rules. The conversion rules are rules for performing a tag conversion process. The conversion rules can be determined independently by a manager of the relaying device 200. The tag conversion process is a process to convert a symbol string not conforming to the tagging rules into a converted symbol string conforming to the tagging rules, or is a process to convert a symbol string treated differently by each of services into a converted symbol string treated identically by the services. FIG. 10 shows an example of the conversion table 281. The conversion table 281 stores an identification number 810, a conversion condition 811, and conversion contents 812. The identification number 810 is a sequential number for identifying each conversion condition. The conversion condition 811 is a condition under which the tag conversion process is to be performed. The conversion contents 812 is information that indicates actual conversion contents.

The conversion condition 811 when the identification number 810 is "1" has, as a condition for performing the conversion process, that a service (e.g., services B and C) recognizing a space included within the symbol string as "split" is included in the service selected by the user. The conversion contents 812 when the identification number 810 is "1", indicates that, in the case that a space is included within a symbol string indicated by the tag information, the space is converted into a splitting symbol """ (called 'double quotation mark')", used in common by the services A to C for splitting the symbol string.

The conversion condition 811 when the identification number 810 is "2" has, as a condition for performing the conversion process, that a service (e.g., service B) erasing a symbol string that follows ", " included in the symbol string is included in the service selected by the user. The conversion contents 812 when the identification number 810 is "2" indicates that, in the case that ", " is included in a symbol string indicated by the tag information, each of a plurality of symbol strings split by a comma is surrounded by the splitting symbol """ """ used in common by the services A to C, for splitting the symbol strings.

The conversion condition 811 when the identification number 810 is "3" has, as a condition for performing the conversion process, that a service (e.g., service C) that does not distinguish between upper-case letters and lower-case letters is included in the service selected by the user. The conversion contents 812 when the identification number 810 is "3" indicates that, in the case that upper-case letters and lower-case letters are included in a symbol string indicated by the tag information, these letters are converted into only upper-case letters, or only lower-case letters.

The conversion condition 811 when the identification number 810 is "4" has, as a condition for performing the conversion process, that a service (e.g., service B) unable to use "-"is included in the service selected by the user. The conversion contents 812 when the identification number 810 is "4" indicates that, in the case that "-" is included in a symbol string indicated by the tag information, the hyphen is converted to "_(called 'underbar')".

The conversion condition 811 when the identification number 810 is "5" has, as a condition for performing the conversion process, that a service (e.g., service A) unable to use an initial or final space of a symbol string is included in the service selected by the user. The conversion contents 812 when the identification number 810 is "5" indicates that, in the case that initial or final spaces are present in a symbol string indicated by the tag information, these spaces are erased.

Moreover, the information storage unit 230 stores a relay program 251. The relay program 251 is a program for relaying the communication between the multi-function devices 100 and 101 and the service providing apparatus 300 in cooperation with the plurality of modules.

Some features relating to the description in the present specification are hereby explained. In the present specification, the description "the control unit 220 of the relaying device 200 receives various types of information" includes the technical meaning "the control unit 220 of the relaying device 200 acquires various types of information via the communication unit 210". Further, the description "the control unit 220 of the relaying device 200 transmits various types of information" includes the technical meaning "the control unit 220 of the relaying device 200 outputs various types of information via the the communication unit 210". Similar features exist regarding the control unit 120 and the communication unit 110 of the multi-function device 100.

Here, a definition of the words "data" and "information" is given. In "data" and "information", "information" is used as a concept superordinate to "data". Thus, "data A" may be rephrased as "information A". Further, "data B" replicated or converted from "data A" is "information A" as long as it is used to have a meaning equivalent to "data A".

<Operation of Service Cooperation System 10>

The operation of the service cooperation system 10 will be described using the sequence diagrams of FIG. 3 to FIG. 7. In step S 192, the control unit 120 of the multi-function device 100 transmits, to the relaying device 200, utilization request information for requesting utilization of the service providing apparatus. In step S300, the control unit 220 of the relaying device 200 generates service selection screen data in response to the acquisition of the utilization request information from the multi-function device 100. The service selection screen data is information for causing the display unit 150 to display a service selection screen for selecting at least one from the plurality of service providing apparatuses. In step S302, the control unit 220 transmits the service selection screen data to the multi-function device 100.

Figure 12:
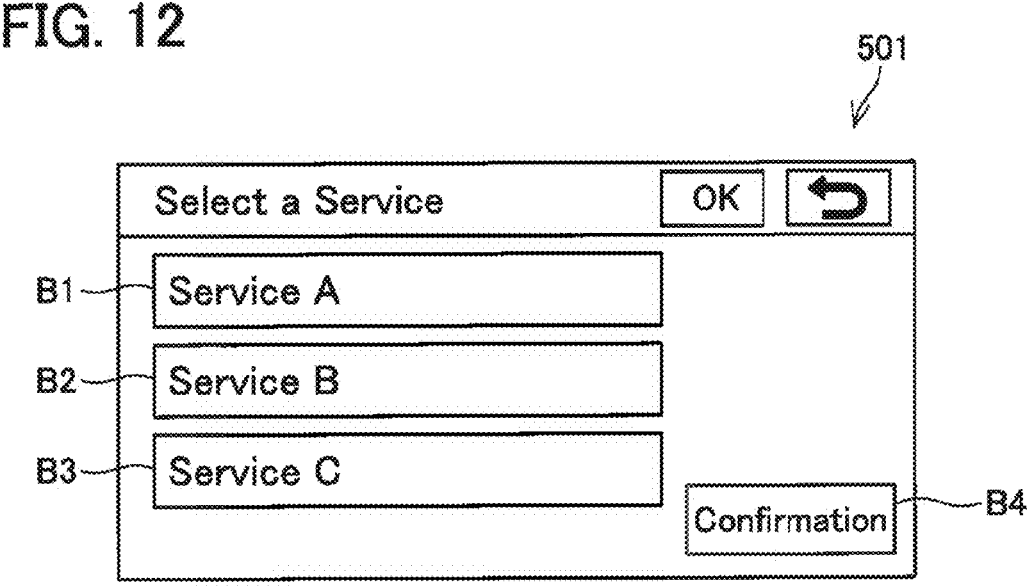
FIG. 12 shows an example of a display screen of a display unit.

In step S194, the control unit 120 displays a service selection screen on the display unit 150. A service selection screen 501 of the description of the present exemplary embodiment is shown in FIG. 12. Button images B1 to B3 for selecting each of the services A to C are displayed on the service selection screen 501. Thus, the user can select a desired service from among the services A to C. Further, the service selection screen 501 can accept the selection of a plurality of services. For example, the services A and B can be selected by touching a confirmation button image B4 after pressing the button images B1 and B2.

In step S195, the control unit 120 waits for the input of a service selection by the user. When the service selection is input, in step S197 the control unit 120 transmits service identification information for identifying the service selected by the user to the relaying device 200, and stores the service identification information in the RAM 123 of the control unit 120. The service identification information is information for identifying the service selected by the user of the multi-function device 100 from among the plurality of services.

In step S304, the control unit 220 receives the service identification information from the multi-function device 100. In step S306, the control unit 220 generates tagging UL/tag retrieval DL selection screen data and transmits said data to the multi-function device 100. Here, "UL" is an abbreviation for "upload" and "DL" is an abbreviation for "download". The tagging UL/tag retrieval DL selection screen data is data for causing a tagging UL/tag retrieval DL selection screen to be displayed on the display unit 150. The tagging UL/tag retrieval DL selection screen is a screen for the user to select either a tagging UL process or tag retrieval DL. The tagging UL process is a process for uploading and storing electronic data in a state of having tag information associated therewith, to the one service or plurality of services selected by the user. The tag retrieval DL process is a process to retrieve and download electronic data associated with the tag information designated by the user. The retrieved and downloaded electronic data is one of the electronic data stored in the one service or plurality of services selected by the user.

In step S198, the control unit 120 receives the tagging UL/tag retrieval DL selection screen data from the relaying device 200. In step S200, the control unit 120 causes the tagging UL/tag retrieval DL selection screen to be displayed on the display unit 150. The items "tagging UL process" and "tag retrieval DL process" are displayed on the tagging UL/tag retrieval DL selection screen as selection items.

In step S202, the control unit 120 waits for the selection of one of the processes "tagging UL process" or "tag retrieval DL process" to be input. When the selection of the process is input, processing proceeds to step S203. In step S203, the control unit 120 transmits, to the relaying device 200, tagging UL/tag retrieval DL identification information indicating the contents of the process selected by the user.

In step S308, the control unit 220 receives the tagging UL/tag retrieval DL identification information from the multi-function device 100. In step S310, the control unit 220 generates input tag/existing tag selection screen data. The input tag/existing tag selection screen data is data for causing an input tag/existing tag selection screen to be displayed on the display unit 150. The input tag/existing tag selection screen is a screen for receiving a selection of whether to use, as tag information used when the user performs an upload or a search, either tag information newly input by the user or existing tag information stored in the past by the user in the service providing apparatus. In step S312, the control unit 220 transmits the input tag/existing tag selection screen data to the multi-function device 100.

In step S204, the control unit 120 receives the input tag/existing tag selection screen data from the relaying device 200. In step S206, the control unit 120 causes the input tag/existing tag selection screen to be displayed on the display unit 150. In step S228, the control unit 120 waits for the selection of either "input tag" or "existing tag" to be input. When the selection is input, processing proceeds to step S229. In step S229, the control unit 120 transmits, to the relaying device 200, input tag/existing tag identification information indicating the contents selected by the user.

In step S322, the control unit 220 determines whether the tag selected by the user is either the input tag or the existing tag. If the input tag has been selected (step S322: input tag), processing proceeds to step S424.

In step S424, the control unit 220 generates tag input screen data. The tag input screen data is data for causing the display unit 150 of the multi-function device 100 to display a tag input screen for receiving input of a symbol string representing the input tag. The tag input screen is a screen for receiving the input of tag information that can be associated with electronic data to be uploaded to the service. For example, the tag input screen may display an input box for receiving the input of a symbol string of the tag. Then, in case the input of the symbol string has been received via the operation unit 180, new input tag information may be generated based on the symbol string that was input. In step S426, the control unit 220 transmits the tag input screen data to the multi-function device 100.

In step S230, the control unit 120 receives the tag input screen data from the relaying device 200. In step S232, the control unit 120 causes the tag input screen to be displayed on the display unit 150. In step S233, the control unit 120 waits to receive an input operation of input tag information. When the input is executed, processing proceeds to step S235. In step S235, the control unit 120 transmits input tag information to the relaying device 200. The input tag information is information that indicates the symbol string input in step S233. Moreover, a symbol is a graphic symbol with a meaning, such as a character (e.g.: letter of the alphabet or hiragana) or a mark (e.g.: space, comma), etc. Thus, a symbol is a superordinate concept to a character, and a symbol string is a concept that includes a character string. An example of information that indicates a symbol string is a plurality of symbol code information. Symbol code information is a concept that includes character code information. In step S427, the control unit 220 receives the input tag information.

Further, contents of a process in case it is determined that "existing tag" has been selected in step S322 (step S322: existing tag) will be described. In this case, processing proceeds to step S338 of FIG. 6. In step S338 and step S340, a second process P2 is executed. The second process P2 is a process for acquiring a tag list from the service selected by the user. If a plurality of services is selected by the user, the tag list is acquired from each of the plurality of services.

In step S338, the control unit 220 transmits tag list request information to the service providing apparatus of the service selected by the user. The tag list request information is information for requesting the tag list from the service providing apparatus. The tag list is an information element storing multiples of stored tag information and identification information of the stored tag information in association with each of the stored electronic data stored by the user in the service providing apparatus. The identification information may be ID information. The stored tag information includes input tag information input by the user in the past, and selected tag information selected by the user in the past. The tag list request information is information that has specifications unique to the selected service. Thus, by creating and sending the tag list request information by using the tag list request program 233 stored in the information storage unit 230, it is possible to match the tag list request information with the specifications of the selected service.

In step S340, the control unit 220 acquires the tag list from the selected service providing apparatus. Thereby, one time of processing of the second process P2 is completed. Then, the second process P2 is executed repeatedly until the tag lists have been acquired from all the selected services. For example, in case the services A and B have been selected, the second process P2 is repeated two times for the services A and B.

In step S424a, the control unit 220 creates tag selection screen data. The tag selection screen data is data for causing a tag selection screen to be displayed on the display unit 150 of the multi-function device 100. The tag selection screen is a screen for receiving input that designates, as the selected tag information, at least one tag information from the plurality of stored tag information included in the tag list. A list of candidates for the selected tag information may be displayed on the tag input screen. The tag selection screen data may include the stored tag information that is the candidate of the selected tag information, and the identification information corresponding to the stored tag information. In step S426a, the control unit 220 transmits the tag selection screen data to the multi-function device 100.

Figure 13:
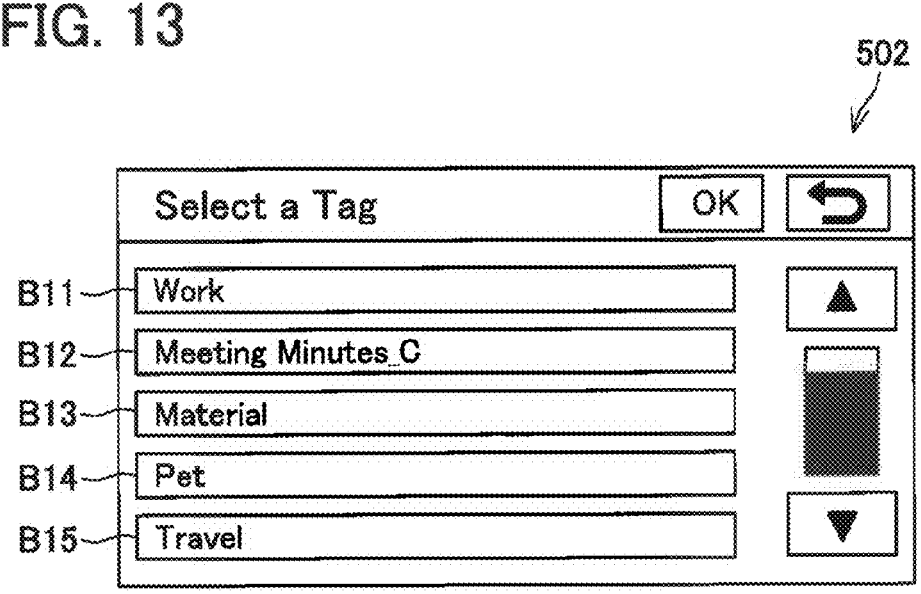
FIG. 13 shows an example of a display screen of a display unit.

In step S232a, the control unit 120 causes the display unit 150 to display the tag selection screen. FIG. 13 shows the tag selection screen 502 in the description of the present exemplary embodiment. Button images B11 to B15 associated with the stored tag information are displayed on the tag selection screen 502. The method of receiving selection of the selected tag information may be, e.g., a method in which stored tag information associated with a button image touched by the user on the tag selection screen 502 is the selected tag information selected by the user. Further, selection of a plurality of selected tag information may be received.

In step S233a, the control unit 120 waits for the selection of the selected tag information to be input. When the selection of the selected tag information is received, processing proceeds to step S235a. In step S235a, the control unit 120 transmits selected tag identification information to the relaying device 200. The selected tag identification information is identification information corresponding to the selected tag information. In step S427a, the control unit 220 receives the selected tag identification information. Then, processing proceeds to step S428 of FIG. 4.

In step S428, the control unit 220 executes the tag conversion process. The tag conversion process is a process for converting the input tag information or the selected tag identification information into converted tag information conforming to the tagging rule in the case that a symbol string indicated by the input tag information received in step S427, or a symbol string indicated by the selected tag identification information received in step S427a does not conform to the tagging rule. In the tag conversion process, in the case that the user has selected a plurality of services as the upload destination of the electronic data or the search destination of the electronic data, converted tag information is created which represents a converted symbol string that conforms with the tagging rules of each of the plurality of the selected services.

Figure 8:
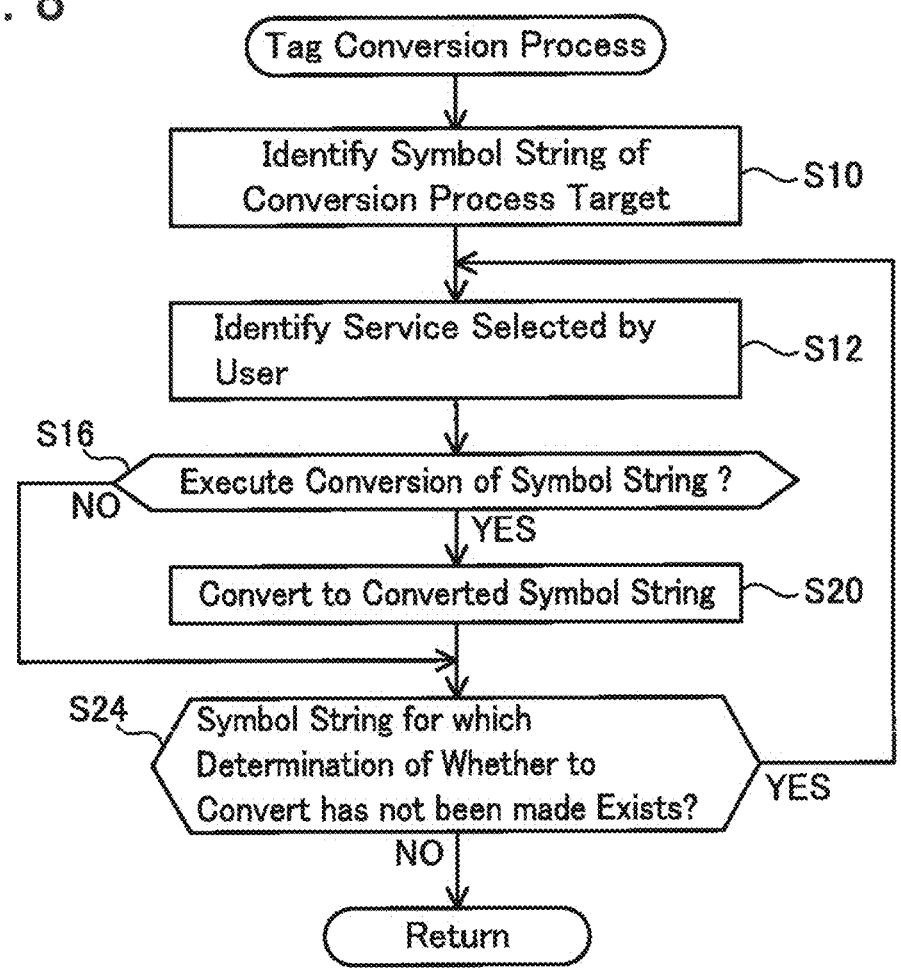
FIG. 8 is a flowchart for explaining an operation example of a tag conversion process.

The contents of the tag conversion process will be described using the flowchart of FIG. 8. In step S10, the control unit 220 identifies the acquired input tag information as a symbol string of the conversion process target. Alternatively, the control unit 220 identifies the selected tag information associated with the selected tag identification information as a symbol string of the conversion process target. In step S12, the control unit 220 identifies the service selected by the user. The service selected by the user may be identified using the service identification information received in step S304. The control unit 220 extracts the conversion condition 811 and the conversion contents 812 applicable to the service selected by the user by using the tag table 280 and the conversion table 281.

In step S16, the control unit 220 determines whether to execute conversion of the symbol string. Specifically, the control unit 220 determines whether specific symbols (e.g.: space, comma, hyphen) that define the tagging rule included in the tag table 280, such as the tagging rules 801 to 805, etc. are included in the symbol string of the conversion process target. If a negative determination is made (step S16: NO), processing proceeds to step S24, if a positive determination is made (step S16: YES), processing proceeds to step S20. In step S20, the control unit 220 identifies the conversion condition 811 corresponding to the symbol determined in step S16 as being included in the symbol string of the conversion process target, and converts the symbol string of the conversion process target by using the conversion contents 812 corresponding to the identified conversion condition 811. Below, the symbol string after conversion is described as a converted symbol string. Further, information indicating the symbol string that indicates the converted symbol string is also described as converted tag information. In step S24, the control unit 220 determines whether there is a symbol string, within the symbol string of the conversion process target, for which the determination of whether to convert the symbol string has not been made. If a positive determination is made (step S24: YES), processing returns to step S12. On the other hand, if a negative determination is made (step S24: NO), the tag conversion process ends.

In step S429, contents of a process selected by the user are determined. This determination may be executed based on the tagging UL/tag retrieval DL identification information received from the multi-function device 100 in step S308. If the content of the selected process is the tagging UL process (step S429: tagging UL), processing proceeds to step S430.

In step S430, the control unit 220 creates an upload execution command. The upload execution command is a command to cause the multi-function device 100 to execute a process for uploading electronic data to the one service or plurality of services selected by the user. The service selected by the user may be identified based on the service identification information received in step S304. In step S434, the control unit 220 adds information to the upload execution command that indicates the tag to be utilized when uploading. Specifically, if converted tag information was generated in step S428, the converted tag information is added. If converted tag information was not generated in step S428, and input tag was selected in step S322, the input tag information is added. If converted tag information was not generated in step S428, and existing tag was selected in step S322, the selected tag information is added. In step S436, the control unit 220 transmits the upload execution command to the multi-function device 100.

In step S238, the control unit 120 receives the upload execution command from the relaying device 200. In step S240, reading of an image is performed. Specifically, the user sets paper, on which a predetermined image has been recorded, on the scanner unit 170, and presses a reading start button of the operation unit 180, whereupon the control unit 120 causes the scanner unit 170 to read the image recorded on the paper, and creates electronic data from the image data that was read. Then, processing proceeds to step S246.

In step S246 to step S476, a first process P1 is executed. The first process P1 is a process for uploading one item of electronic data to one service. In step S246, the control unit 120 transmits an upload destination URL acquisition request to the relaying device 200. The service identification information and the user identification information are included in the upload destination URL acquisition request. The service identification information stored in the RAM 123 in step S197 may be used as the service identification information. The user identification information stored in the information storage unit 130 may be used as the user identification information.

In step S440, the control unit 220 receives the upload destination URL acquisition request from the multi-function device 100. In step S442, the control unit 220 creates UL information request information, and transmits the UL information request information to the service providing apparatus that is the upload destination. The UL information request information is information for requesting the service of the upload destination for an upload destination URL, this being information required to perform uploading to the service of the upload destination. The UL information request information is information having specifications unique to each service. Thus, by creating and transmitting the UL information request information using the URL acquisition program 232 stored in the information storage unit 230, it is possible to match the UL information request information with the specifications of each service. Moreover, the UL information request information that is created at this time is an HTTP message using the API opened by the service of the upload destination.

The specifications of the UL information request information will be described. The information included in the UL information request information may be different for each service. For example if a service side requires, in order to identify an upload destination URL, information such as album ID, etc. for identifying a storage location of electronic data of that service, the UL information request information includes the album ID of the album used by the user. Further, for example, if the service side requires, in order to identify an upload destination URL, information such as folder name, etc. for identifying a storage location of electronic data of that service, the UL information request information includes the folder name used by the user. The additional information used by the user, such as album ID or folder name, may be stored in advance in the information storage unit 230.

In step S444, the control unit 220 receives the upload destination URL from the service providing apparatus that is the upload destination. In step S446, the control unit 220 creates first combination information and an upload message template. The specifications of the upload message may be unique to the service of the upload destination. Thus, by creating the upload message template using the template creating program 234 stored in the information storage unit 230, the upload message template can be matched with the specifications of the service of the upload destination. Moreover, the upload message is, specifically, an HTTP request message. However, the information put into a header and the type and number of information put into a request body is different for each service. For example, some services require information other than binary data of the electronic data, such as file name of the electronic data, to be input into the request body, and some services require only the binary data of the electronic data to be input into the request body, and information such as file name, etc. to be input into the header.

In step S448, the control unit 220 transmits the first combination information, the upload destination URL, and the upload message template to the multi-function device 100. The first combination information is information in which the following is combined: result information destination address, the converted tag information, and the input tag information or the selected tag information. The result information destination address is information for designating a destination when determination result information created by the relaying device 200 in step S466 is to be transmitted to the multi-function device 100 in step S476. In step S247, the control unit 120 receives the first combination information, the upload destination URL, and the upload message template from the relaying device 200.

In step S248, the control unit 120 creates an upload message based on the received template, the received upload destination URL, and the electronic data created in step S240. Specifically, the multi-function device 100 stores various types of information such as binary data of electronic data and a data size of the electronic data at a predetermined position of the template received from the relaying device 200. Due to this, it is possible to create the upload message corresponding to the service of the upload destination. In step S249, the control unit 120 transmits the upload message to the service providing apparatus of the service of the upload destination by using the upload destination URL.

In step S254, the control unit 120 determines whether upload result information and electronic data identification information have been received from the service providing apparatus of the upload destination. The upload result information is information representing whether electronic data has been properly uploaded to the service providing apparatus of the upload destination. The electronic data identification information is information for identifying electronic data that has been properly uploaded to the service providing apparatus of the upload destination. An example of the electronic data identification information is a file ID.

In step S258, the control unit 120 generates second combination information and transmits the same to the relaying device 200. The second combination information is information that combines upload notification information and the upload result information in addition to the first combination information. The upload notification information is information that includes tagging request information and electronic data identification information. The tagging request information is information requesting the converted tag information, the input tag information, or the selected tag information included in the first combination information to be associated with the electronic data identified by the electronic data identification information. In this manner, since the second combination information has a layered structure that includes various types of information, it is possible to communicate various types of information such as the upload result information and the tagging request information with one communication request.

In step S462, the control unit 220 receives the second combination information from the multi-function device 100. In step S466, the control unit 220 decodes the upload result information included in the second combination information and creates a decoding result information. Since the upload result information is information that is transmitted from the service providing apparatus of the upload destination, the information has specifications unique to the service of the upload destination. Thus, it is possible to decode the upload result information using the decoding program 235 stored in the information storage unit 230. The decoding result information is a message of such a format that can be decoded by the multi-function device 100. The decoding result information includes an upload result that is included in the decoded upload result information.

In step S470, the control unit 220 transmits electronic data identification information and tagging instruction information to the service providing apparatus of the upload destination. The tagging instruction information is information for requesting the service providing apparatus of the upload destination to assign the tag information, requested by the tagging request information, to the electronic data identified by the service of the upload destination based on the electronic data identification information. Further, the tagging instruction information is information including tag information that the tagging request information requests to associate to the electronic data. Moreover, the tagging instruction information is information that has specifications unique to the service of the upload destination. Thus, by creating and transmitting the tagging instruction information using the tagging instruction program 231 stored in the information storage unit 230, it is possible to match the tagging instruction information with the specifications of the service of the upload destination.

In step S472, the control unit 220 receives tagging result information from the service providing apparatus of the upload destination. In step S476, the control unit 220 transmits the decoding result information and the tagging result information to the multi-function device 100. Thereby, one time of processing of the first process P1 ends.

Then, the first process P1 is repeatedly executed until all the electronic data that is the upload target is uploaded to all the selected services. For example, if two items of electronic data are to be uploaded to the services A and B, the first process P1 is repeated four times.

When all of the first process P1 is ended, in step S263, the control unit 120 displays on the display unit 150 whether the upload has succeeded based on the determination result information and the tagging result information. Due to this, the user can check whether the upload has succeeded. Moreover, when the upload has succeeded, the user can check where the uploaded electronic data is stored. In step S281, the control unit 120 displays a message indicating a proper completion of the process on the display unit 150, and the process ends.

Figure 4:
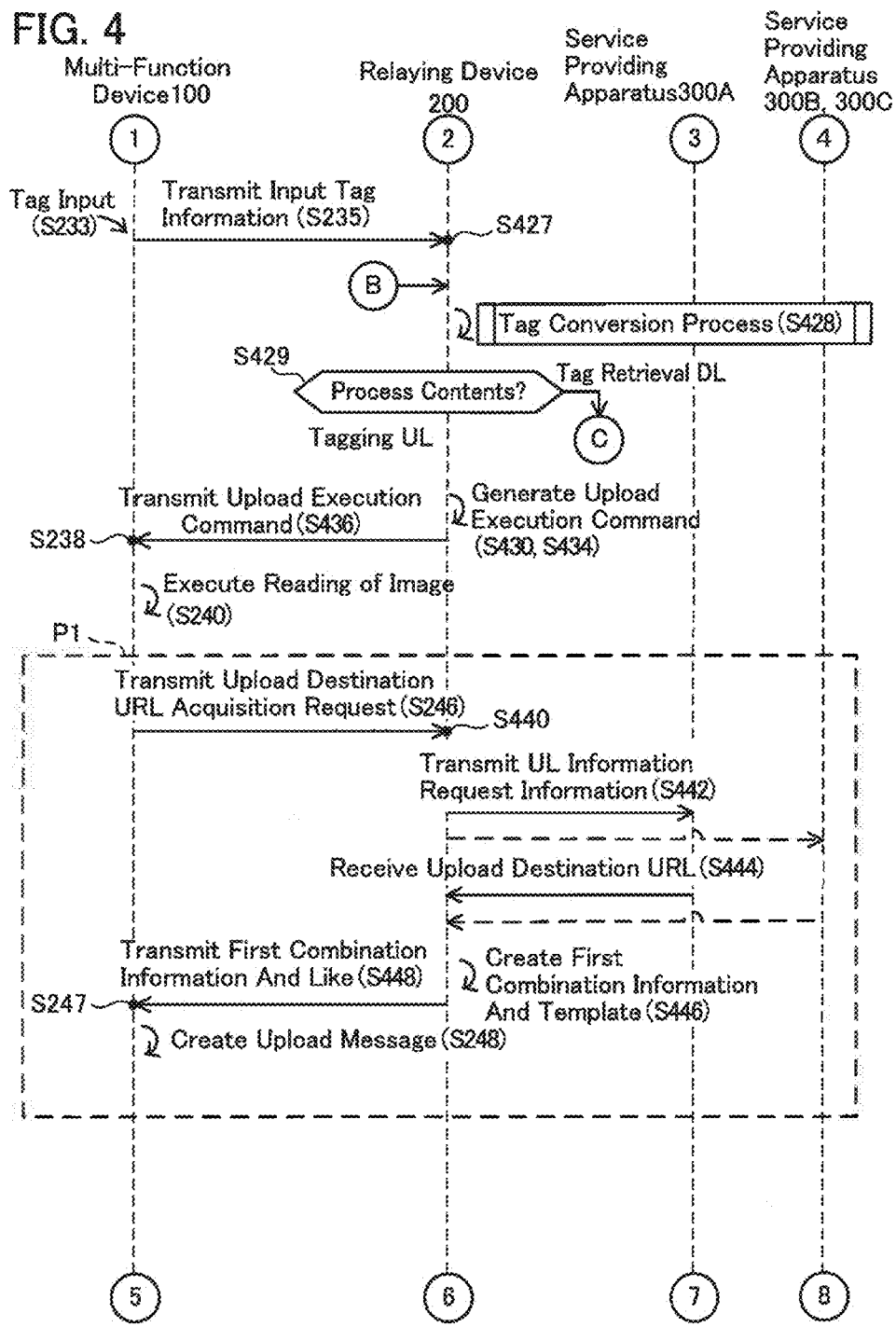
FIG. 4 is a sequence diagram for explaining an operation example of the service cooperation system.
Figure 5:
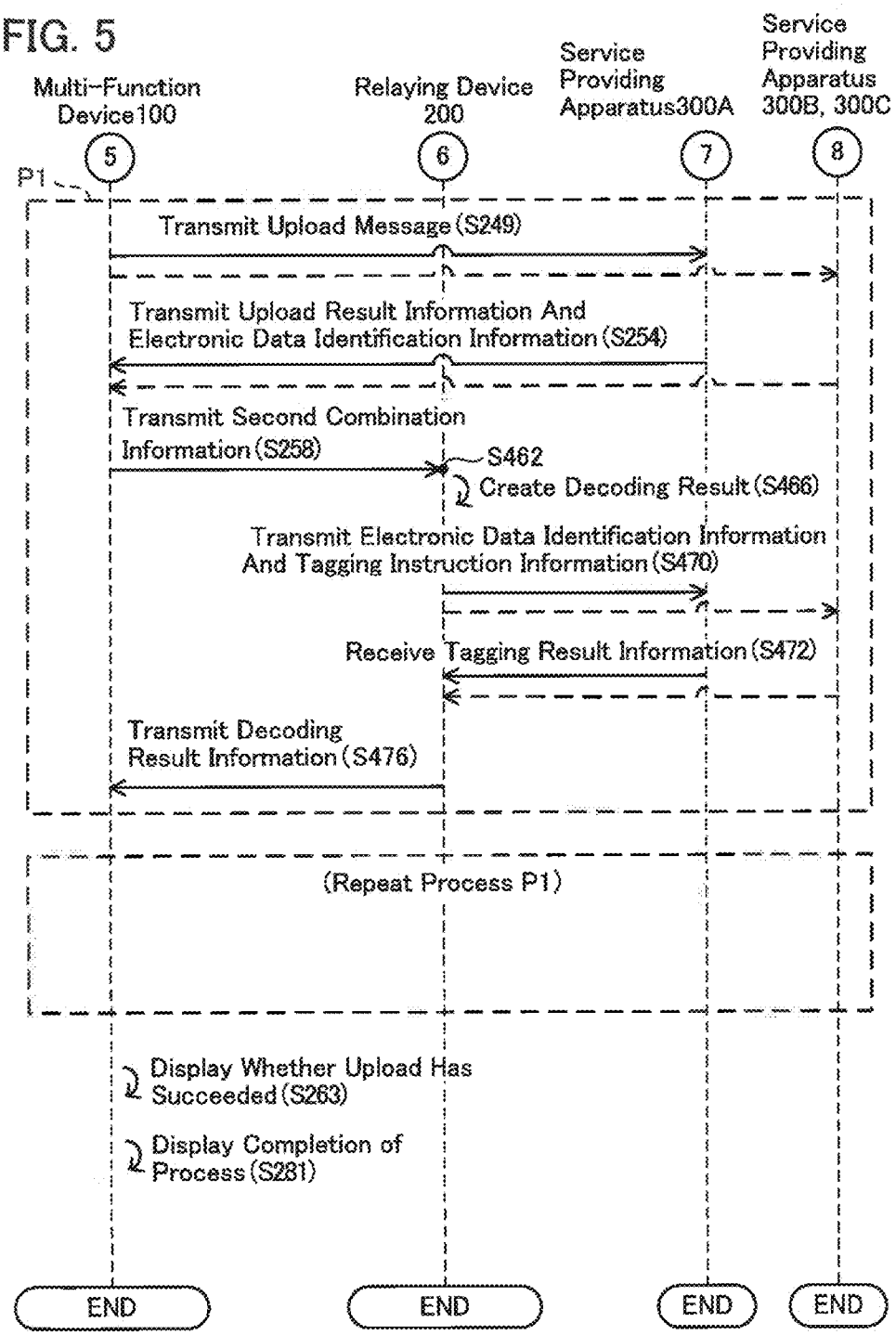
FIG. 5 is a sequence diagram for explaining an operation example of the service cooperation system.
Figure 6:
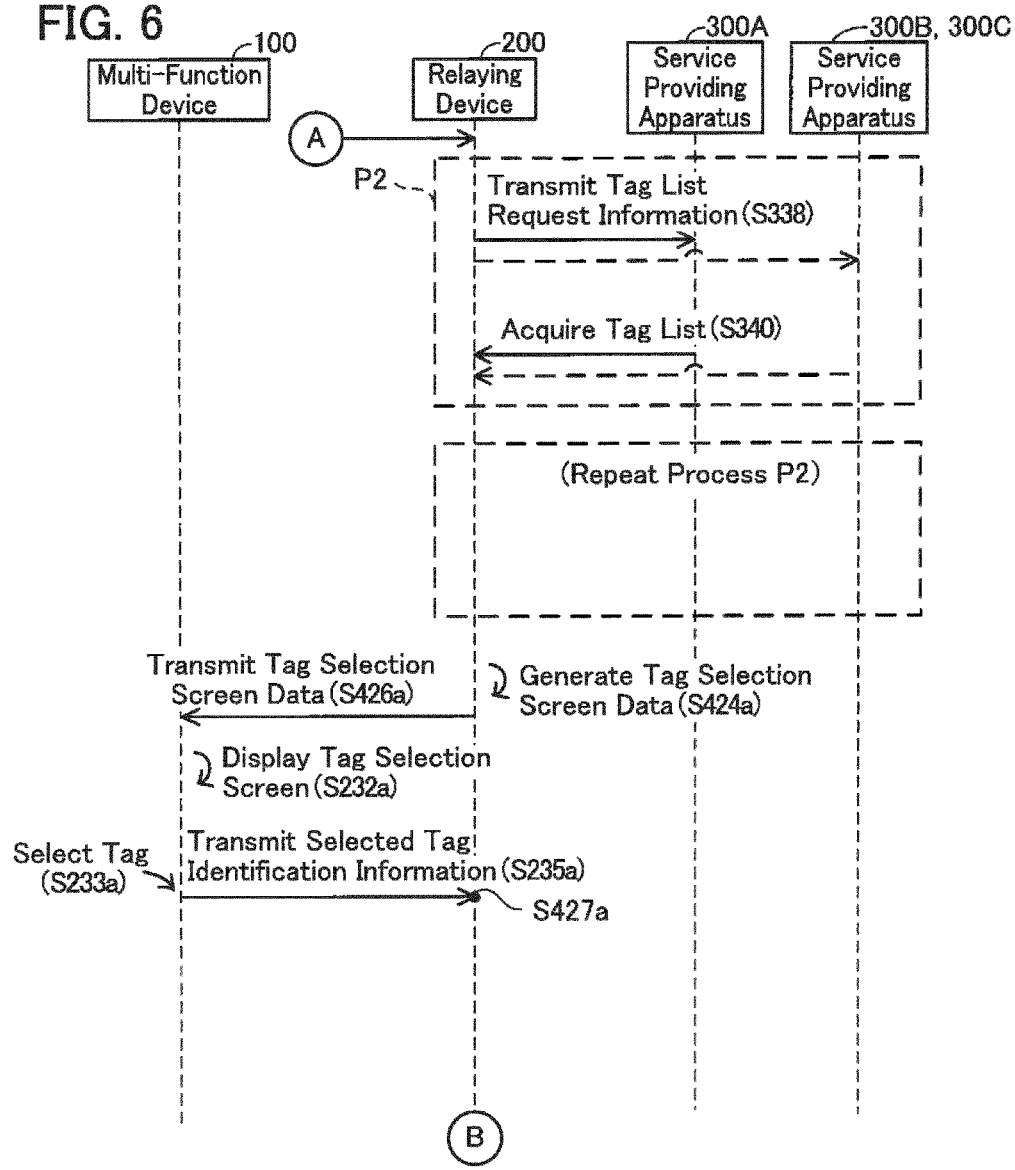
FIG. 6 is a sequence diagram for explaining an operation example of the service cooperation system.
Figure 7:
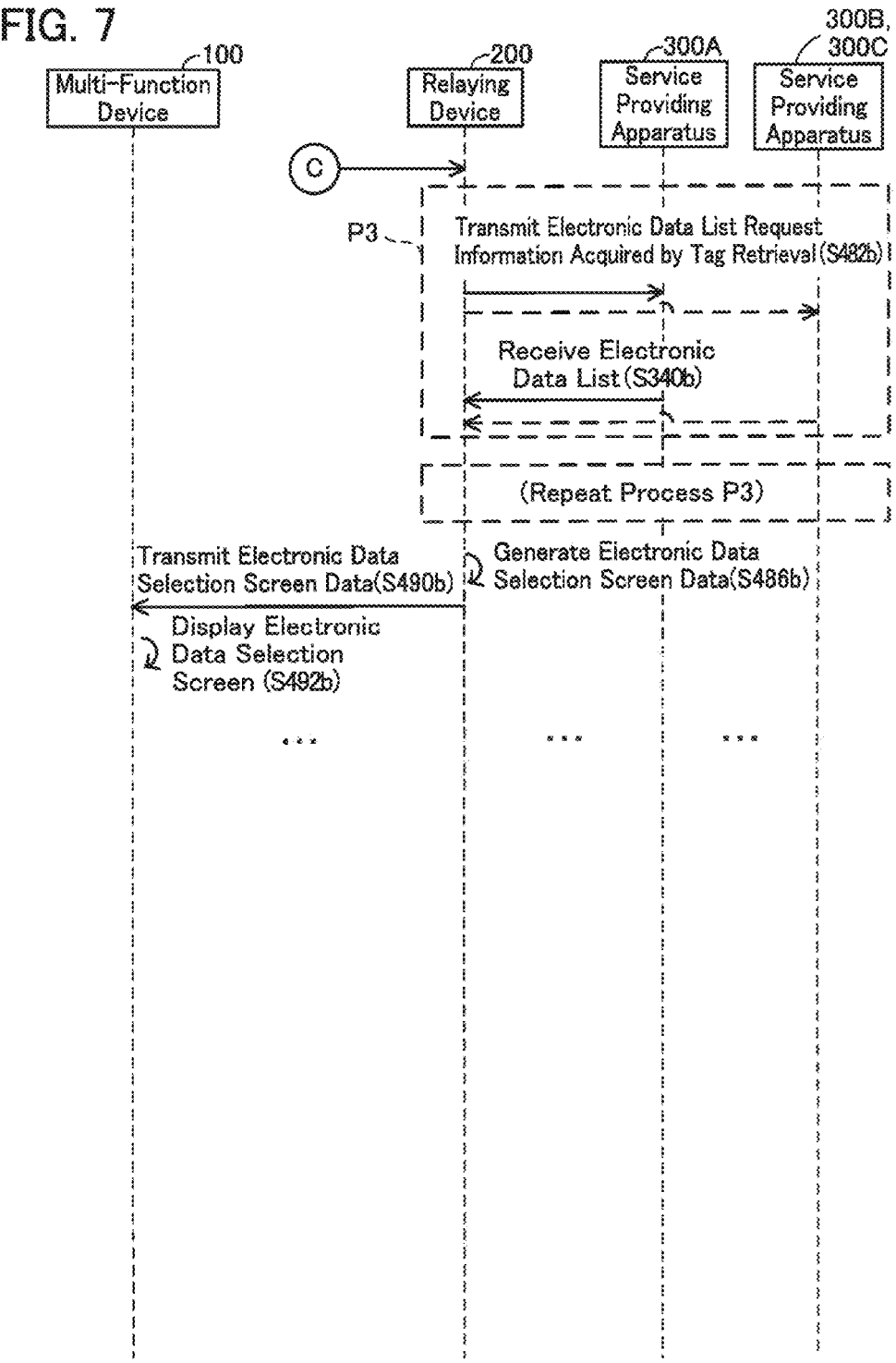
FIG. 7 is a sequence diagram for explaining an operation example of the service cooperation system.

Further, in step S429 of FIG. 4, the contents of a process in the case of determining the contents of the process to be "tag retrieval DL" (step S429: tag retrieval DL) will be described. In this case, processing proceeds to step S482b of FIG. 7. In step S482b and step S340b, a third process P3 is executed. The third process P3 is a process in which, using at least one of the input tag information, the selected tag information, and the converted tag information, tag retrieval is performed of the electronic data stored by the service selected by the user. As a result of the tag retrieval, an electronic data list, this being a list of related electronic data, is acquired from the service selected by the user. If a plurality of services is selected by the user, the electronic data list is acquired from each of the plurality of services.

In step S482b, the control unit 220 transmits electronic data list request information acquired by means of the tag retrieval to the service providing apparatus selected by the user. The electronic data list request information acquired by the tag retrieval is information for requesting execution of a process to retrieve electronic data related to at least one of the input tag information, the selected tag information and the converted tag information from among the plurality of electronic data stored by the service providing apparatus. At this juncture, at least one of the input tag information, the selected tag information and the converted tag information is transmitted in association with the electronic data list request information acquired by the tag retrieval.

In step S340b, the control unit 220 receives the electronic data list from the selected service providing apparatus. The electronic data list is a list showing results of retrieval, in the storage area of the service providing apparatus, of the electronic data related to at least one of the input tag information, the selected tag information and the converted tag information transmitted in step S482b. Thereby, one time of processing of the third process P3 ends. The third process P3 is executed repeatedly until the electronic data list is acquired from all the selected services. For example, in the case that the services A and B have been selected, the third process is repeated two times for the services A and B.

In step S486b, the control unit 220 generates electronic data selection screen data. The electronic data selection screen data is data for causing the display unit 150 of the multi-function device 100 to display an electronic data selection screen. The electronic data selection screen is a screen for receiving input of whether to designate, as selected electronic data, any of the plurality of stored electronic data included in the electronic data list. A list of candidates for the selected electronic data may be displayed on the electronic data selection screen. In step S490b, the control unit 220 transmits the electronic data selection screen data to the multi-function device 100. In step S492b, the control unit 120 causes the display unit 150 to display the electronic data selection screen. Subsequent operations are not shown. When the selected electronic data has been selected by the user, the selected electronic data is transmitted to the relaying device 200. The control unit 220 acquires a download source URL for accessing the selected electronic data from the service providing apparatus selected by the user, and transmits the download source URL to the multi-function device 100. The multi-function device 100 acquires the selected electronic data from the service providing apparatus by using the download source URL. The multi-function device 100 executes various types of processes, such as printing, using the acquired selected electronic data.

<Operation Example 1>

In operation example 1, flow will be described for a case in which the user uploads electronic data using the multi-function device 100. Further, as an example, a case will be described in which the tag table 280 of FIG. 9 and the conversion table 281 of FIG. 10 are stored in the information storage unit 230. Further, as an example, flow will be described for a case in which the services A and B have been selected in step S195 as the upload destination of the electronic data. Further, a case will be described in which the user has selected the input tag in step S228.

In response to the user operating the operation unit 180 of the multi-function device 100 and transmitting the utilization request information to the relaying device 200 (step S192), the service selection screen (see FIG. 12) is displayed on the display unit 150 (step S194). In response to the user selecting the services A and B (step S195), the service identification information for identifying the services A and B is transmitted to the relaying device 200 (step S197). Next, the tagging UL/tag retrieval DL selection screen is displayed on the display unit 150 (step S200). In response to the user selecting the "tagging UL process" (step S202), the tagging UL/tag retrieval DL identification information indicating "tagging UL process" is transmitted to the relaying device 200 (step S203). Next, the display unit 150 displays the input tag/existing tag selection screen (step S206). In response to the user selecting "input tag" (step S228), the input tag/ existing tag identification information indicating "input tag" is transmitted to the relaying device 200 (step S229).

The relaying device 200 determines that input tag has been selected by the user (step S322: input tag), and transmits the tag input screen data to the multi-function device 100 (step S426). The multi-function device 100 displays the tag input screen on the display unit 150 (step S232). In response to the user inputting the input tag information (step S233), the input tag information is transmitted to the relaying device 200 (step S235).

The relaying device 200 executes the tag conversion process (step S428). First, the symbol string of the conversion process target is identified (FIG. 8, step S10). For example in step S233, in case a symbol string "□meeting minutes-C□material□" (here, □ indicates "space") was input by the user, the symbol string "□meeting minutes-C□material□" is identified as the conversion process target. The services A and B are identified as the services selected by the user (step S12). Then, the conversion contents 812 and the conversion condition 811, for when the identification numbers 810 are "1", "4" and "5" in the conversion table 281 of FIG. 10, are extracted (step S12). The extracted conversion condition 811 indicates that the conversion process is performed in the case that a space and a hyphen are included. Further, the symbol string of the conversion process target includes a space and a hyphen. Thus, using the extracted conversion contents 812, it is determined to be a case of converting the symbol string of the conversion process target (step S16: YES). Using the conversion contents 812 in which the identification numbers 810 are "1", "4" and "5", the symbol string "□meeting minutes-C□material□" is converted to the converted symbol string ""meeting minutes _C" "material"" (step S20).

Further, for example, in case a symbol string "travel, pet" was input by the user in step S233, the symbol string "travel, pet" is identified as the conversion process target. In this case, the conversion contents 812 and the conversion condition 811 for when the identification number 810 is "2" in the conversion table 281 of FIG. 10 are extracted (step S12). Using the conversion contents 812 for when the identification number 810 is "2", the symbol string "travel, pet" is converted to the converted symbol string ""travel" "pet"" (step S20).

The converted tag information is added to the upload execution command (step S434), and transmitted to the multi-function device 100 (step S436). The multi-function device 100 executes reading of the image (step S240). A first time of performing the first process P1 is executed, and the electronic data identification information which identifies the uploaded electronic data, and the tagging instruction information which instructs the converted tag information to be assigned is transmitted to the service providing apparatus 300A (step S470). Further, a second time of performing the first process P1 is executed, and the electronic data identification information which identifies the uploaded electronic data, and the tagging instruction information which instructs the converted tag information to be assigned is transmitted to the service providing apparatus 300B (step S470). The multi-function device 100 causes the display unit 150 to display whether the upload has succeeded (step S263).

<Advantages>

In the service cooperation system 10 disclosed in the present exemplary embodiment, the process (for example, step S470) of associating tag information with the electronic data uploaded to the service from the multi-function device 100 can be executed by the relaying device 200. Due to this, it is possible to eliminate the need to store programs and the like (for example, the tag list request program 233 and the tagging instruction program 231) for executing the process of associating tag information in the multi-function device 100. Moreover, it is possible to eliminate the need to cause the multi-function device 100 to execute updating or the like of these programs. Therefore, it is possible to prevent a situation in which the volume of the information storage unit 130 of the multi-function device 100 decreases or the communication capability or the processing capability of the multi-function device 100 decreases.

The tag information that was input (step S233) or selected (step S233a) by the user may not be compatible with the tagging rules of the service providing apparatus selected (step S195) by the user as the upload destination or retrieval destination of the electronic data. For example, in the case that service B is included in the service selected by the user, the tagging rule will be applied in which the symbol string subsequent to ", " included in the symbol string of the tag information is erased. However, in the case that the user intends to input two items of tag information "ABC" and "DEF", and the symbol string "ABC, DEF" was input or selected, the tag information "DEF" may be erased. To deal with this, in the service cooperation system 10 described in the present exemplary embodiment, it is possible to convert the symbol string "ABC, DEF" into the converted symbol strings ""ABC" "DEF"". The converted symbol strings ""ABC" "DEF"" are symbol strings which can be made to identify the two items of tag information "ABC" and "DEF" in service B. Thus, the tag information can be made to conform to the service B (step S482). Due to this, it is possible to prevent the problem from occurring in which the service server cannot be made to recognize tag information as intended by the user.

Further, in the tag conversion process (step S428), the conversion condition 811 and the conversion contents 812 are extracted for all the services selected by the user (step S12). Then, using all the extracted conversion contents 812, the symbol string of the tag information is converted into the converted symbol string (step S20). Due to this, the converted tag information can be created so as to conform in common with all the tagging rules used in all the services selected by the user, and thus it is possible to prevent a problem occurring in all the selected services.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

<Modification 1>

In step S470, the input tag information or the selected tag information may be transmitted in the case that the input tag information or the selected tag information conforms to the tagging rules of the service providing apparatus that is the access destination. Further, in step S470, the converted tag information may be transmitted in the case that the input tag information or the selected tag information does not conform to the tagging rules of the service providing apparatus that is the access destination. As a specific example, in the case that the services A to C are selected in step S195 as the upload destination of the electronic data, a case may be considered in which the user inputs the symbol string "□ABC□" (here, □ indicates "space") in step S233. The symbol string (i.e., "□ABC□") represented by the input tag information is transmitted to a service (e.g., services B and C) able to use initial and final spaces. On the other hand, a symbol string (i.e., "ABC") represented by the converted tag information is transmitted to a service (e.g., service A) unable to use initial and final spaces. Due to this, in the case that the input tag information or the selected tag information conforms to the tagging rules of the service providing apparatus that is the access destination, the tag information can be output without executing the tag conversion process (step S428), and so the occurrence of problems can be addressed efficiently.

<Modification 2>

The tag conversion process (step S428) may be executed on the stored tag information which was acquired by executing the second process P2 (step S338, step S340). Due to this, stored tag information that does not conform to the tagging rule of the service selected by the user can be converted into converted tag information that conforms to the tagging rule. Alternatively, stored tag information which undergoes different treatment by a plurality of services selected by the user can be converted into converted tag information which undergoes identical treatment by the plurality of services. In step S424a, tag selection screen data, for selecting selected tag information from among the stored tag information not requiring conversion or converted tag information after conversion, may be generated. Due to this, when the tag information that is the candidate for the selected tag information is to be listed in step S232a, tag information conforming to the tagging rule of the service selected by the user can be displayed as the candidate for the selected tag information. Alternatively, tag information wherein stored tag information treated differently by the plurality of services selected by the user has become tag information treated identically by the plurality of services can be displayed as the candidate for the selected tag information.

<Modification 3>

A configuration is possible which, for each of a plurality of users, is able to store an available service which is available to the user from among the services A to C, in the relaying device 200 and the multi-function devices 100 and 101. Information to be stored may be a user name or password registered in each service. For example, the services A and B may be stored as the available services of a user a, and service C may be stored as the available service of a user b. In the case that the available service available to the user is stored in advance in the relaying device 200, step S300 to step S304 of FIG. 3 may be omitted. In the case that the available service available to the user is stored in advance in the multi-function devices 100 and 101, step S300 to step S195 of FIG. 3 may be omitted. In step S197, the control unit 120 may transmit service identification information corresponding to the available service for which the user has been stored. In the flowchart of step S12 of FIG. 8, the control unit 220 may acquire the available service for which the user has been stored. Further, in P1 of FIGS. 4 and 5, P2 of FIG. 6, and P3 of FIG. 7, the control unit 220 may communicate with the available service for which the user has been stored. Then, using the conversion table 281, the control unit 220 may extract the conversion condition 811 and the conversion contents 812 that conform to all the available services for which the user has been stored. Due to this, it is possible to prevent the occurrence of problems in all the available services for which the user has been stored.

<Modification 4>

In the second process P2 (step S338, step S340), tag lists may be acquired from all the service providing apparatuses identified by the service identification information communicated in step S197. Further, in the second process P2, the tag list may be acquired from one among a plurality of service providing apparatuses. For example, the following process may be executed to realize a configuration which acquires the tag list from one among a plurality of service providing apparatuses. In case "existing tag" was selected in step S228, the control unit 120 receives a selection of one service providing apparatus for which the existing tag is to be downloaded. In step S229, the control unit 120 transmits, to the relaying device 200, the input tag/existing tag identification information, and the identification information of the one selected service providing apparatus. In step S338 to 340, the tag list is acquired only from the one selected service providing apparatus.

<Other Modifications>

Processing that uses existing tags may be omitted. In this case, step S322 is omitted, and processing proceeds from step S299 to step S424. Further, the process of FIG. 6 may be omitted. Processing executing tag retrieval DL may be omitted. In this case, step S429 is omitted, and processing may proceed from step S428 to step S430. Further, the process of FIG. 7 may be omitted. From the above, generally speaking, the relaying device 200 may comprise at least a "receiving designated tag information", a "converting the designated tag information into converted tag information" and a "transmitting the converted tag information". As a specific example, the relaying device 200 may execute at least step S235, step S428, and step S470.

The tag information communicated by the service cooperation system 10 may be information having various types of format. For example, the input tag information communicated in step S235, and the selected tag identification information communicated in step S235a may be information that indicates a symbol string configuring the tag, or may be ID information (e.g., serial number) for identifying a symbol string configuring the tag. Further, in case of using the ID information, associating the symbol string configuring the tag and the ID information may be performed by any of the multi-function devices 100 and 101, the relaying device 200, and the service providing apparatuses 300A to C.

The "existing tag information" used in step S310, etc. may include tag information stored by another user, or tag information stored by another service.

The tag conversion process executed in step S428 is not restricted to being executed by the relaying device 200, but may also be executed by the multi-function devices 100 and 101, or by a server device for conversion (not shown). In this case, the multi-function devices 100 and 101 or the server device for conversion may store the tag table 280 and the conversion table 281.

In the case that the service which acquired the tag information and the service which stores the tag information are matching, ID information for identifying the tag information may be used instead of the information that indicates the symbol string of the tag information. As a specific example, in step S434 the control unit 220 may add, to the upload execution command, ID information for identifying the existing tag information.

The types of information included in the first or second combination information are examples. Other types of information may be included in the first or second combination information, and the information described in the present exemplary embodiment may be not included.

An embodiment where the first or second combination information uses a layered structure has been described. (For example, a case that the second combination information has a structure that combines the upload notification information and the upload result information in addition to the first combination information has been described. Moreover, a case that the upload notification information includes the tagging request information and the electronic data identification information has been described.) However, the layered structure may have various embodiments because it is only necessary to communicate information required for the respective processes. For example, the second combination information may include a result information destination address, input tag information, tagging request information, electronic data identification information, upload result information, and the like.

In step S446, although a case that the control unit 220 of the relaying device 200 creates the template for the upload message has been described, the present invention is not limited to this. For example, the templates corresponding to the respective services may be stored in advance in the information storage unit 230, and the relaying device 200 may transmit the stored templates to the multi-function device 100.

In the present exemplary embodiment, an embodiment where the multi-function device 100 transmits the upload result information received from the service providing apparatus 300 to the relaying device 200 and the relaying device 200 decodes the upload result information has been described. However, the present invention is not limited to this embodiment, and for example, the process of decoding the upload result information may be omitted. In this case, for example, the process of creating the decoding result information in step S466 may be also omitted. Moreover, the second combination information generated in step S258 may not include the upload result information.

In the above embodiment, although the URL is described as an example of the address of the upload destination, the present invention is not limited to this. The upload destination address may be information that is added to the URL as an option and may be information that is included in the body portion of HTTP communication.

There may be various embodiments in which the multi-function device 100 and the relaying device 200 cooperate in executing the upload, etc. of electronic data such as, for example, the following. The multi-function device 100 transmits the upload message and the tagging request information to the relaying device 200 in step S249. Using the upload destination URL, the relaying device 200 transfers the upload message to the service providing apparatus. Then, the relaying device 200 receives the upload result information and the electronic data identification information. The relaying device 200 transmits, to the service providing apparatus, the electronic data identification information received from the service providing apparatus and the tagging instruction information which instructs tagging of tag information requested by the multi-function device 100 by means of the tagging request information. Due to this, the tag information is associated with the electronic data transmitted by the multi-function device 100.

What is claimed is:

1. A relaying device comprising:
   a network interface;
   a processor coupled to the network interface; and
   a memory configured to store tagging rule information concerning a tagging rule relating to tag information for a plurality of service servers on a network capable of storing at least one tag information in association with stored contents data, the memory storing the tagging rule information in correspondence with each of the plurality of service servers, the memory further storing instructions, when executed by the processor, that cause the relaying device to perform:
   receiving, via the network interface, selected service identification information being for identifying at least one selected service server selected by an image processing device from among the plurality of service servers;
   receiving, via the network interface, designated tag information designated by an image processing device;
   determining whether the received designated tag information conforms to the tagging rule;
   only when it is determined that the received designated tag information does not conform to the tagging rule corresponding to the selected service server identified by the received selected service identification information,
      converting the received designated tag information into converted tag information, the converted tag information conforming to the tagging rule corresponding to the selected service server, and converting a symbol string, included in the received designated tag information, and being treated differently by each tagging rule corresponding to each of the plurality of service servers, into a converted symbol string treated identically by the tagging rules corresponding respectively to the plurality of service servers; and
   transmitting, via the network interface, the converted tag information to the service server.

2. The relaying device of claim 1, wherein
the instructions further cause the relaying device to perform:
   receiving, via the network interface, utilization request information requesting utilization of the service server transmitted by one image processing device from among a plurality of the image processing devices;
   transmitting service server selection screen information to the one image processing device in a case that the utilization request information is received in the receiving of the utilization request information, the service server selection screen information being for displaying a service server selection screen for a selection of at least one selected service server among the plurality of service servers corresponding to the tagging rule information; and
   transmitting tag designation screen information to the one image processing device in the case that the utilization request information is received, the tag designation screen information being for displaying a tag designation screen for identifying the designated tag information;
wherein
the receiving of the selected service identification information includes: receiving the selected service identification information transmitted by the one image processing device via the network interface after having transmitted the service server selection screen information,
the receiving of the designated tag information includes: receiving the designated tag information transmitted by the one image processing device after having transmitted the tag designation screen information, and
the converting includes, in a case that the selected service identification information is received and the designated tag information is received, converting the designated tag information into the converted tag information conforming to the tagging rule corresponding to the selected service server in a case that the designated tag information identified by the received designated tag information does not conform to the tagging rule corresponding to the selected service server identified by the received selected service identification information.

3. The relaying device of claim 2, wherein
the instructions further cause the relaying device to perform: receiving stored tag information stored by a first service server among the plurality of service servers and transmitted by the first service server,
the tag designation screen information is for displaying a tag designation screen for designating any of the received stored tag information as the designated tag information,
the receiving of the designated tag information includes: receiving the designated tag information after having transmitted the tag designation screen information,
the converting includes, in a case that the received designated tag information does not conform to the tagging rule corresponding to a second service server different from the first service server, implementing at least one of the following (A) and (B):
  (A) converting the designated tag information to the converted tag information conforming to the tagging rule corresponding to the second service server;
  (B) converting a symbol string into converted symbol string, the symbol string being included in the designated tag information and being treated differently by each tagging rule corresponding to each of the plurality of service servers, the converted symbol string being treated identically by the tagging rules corresponding respectively to the plurality of service servers, and
the transmitting of the converted tag information includes transmitting the converted tag information converted in the converting to the second service server.

4. The relaying device of claim 1, wherein
the converting includes: creating converted tag information, in a case that the network interface has received the selected service identification information for identifying a plurality of selected service servers selected from among the plurality of service servers, and
the converted tag information created in the creating conforms to all of the tagging rules corresponding to the plurality of selected service servers.

5. The relaying device of claim 1, wherein
the converting includes: converting the designated tag information into converted tag information, in a case that the selected service identification information identifying a plurality of the selected service servers selected from among the plurality of service servers is received, and the received designated tag information does not conform to the tagging rule corresponding to one selected service server among the plurality of selected service servers,
the converted tag information converted in the converting conforms to the tagging rule corresponding to the one selected service server, and
the transmitting of the converted tag information includes: transmitting the converted tag information converted in the converting to the one selected service server, and transmitting the designated tag information to one or more of other selected service servers different from the one selected service server.

6. The relaying device of claim 1, wherein
the instructions further cause the relaying device to perform: receiving, via the network interface, selection contents identification information selected by the image processing device from among a plurality of contents data stored by the service server, the selection contents identification information being information for identifying selection contents data to be associated with the tag information and,
the transmitting of the converted tag information includes: transmitting the converted tag information converted in the converting to the service server in association with the selection contents identification information received by the receiving of the selection contents identification information.

7. The relaying device of claim 1, wherein
the transmitting of the converted tag information includes: transmitting the converted tag information converted in the converting to the service server in association with retrieval information for requesting retrieval of a plurality of contents data stored by the service server, and
the instructions further cause the relaying device to perform:
  receiving, via the network interface, retrieval contents identification information for identifying at least one contents data among the plurality of contents data, the retrieval contents identification information being transmitted by the service server after the converted tag information and the retrieval information have been transmitted in association; and
  transmitting, to the image processing device, retrieval contents information based on the received retrieval contents identification information.

8. The relaying device of claim 1, wherein
the tagging rule information includes conversion rule identification information for identifying a conversion rule to cause tag information not conforming to the tagging rule to conform to the tagging rule,
the converting includes at least one of:
  converting the designated tag information not conforming to the tagging rule into converted tag information conforming to the tagging rule, according to the conversion rule identified by the conversion rule identification information, and
  converting a symbol string, included in the designated tag information, and being treated differently by each tagging rule corresponding to each of the plurality of service servers, into converted symbol string treated identically by the tagging rules corresponding respectively to the plurality of service servers.

9. The relaying device of claim 8, wherein
types of the tagging rule include a splitting rule by which the symbol string is split before and after a specific symbol in a case that the specific symbol is included in the symbol string including a plurality of symbols, the symbol string being indicated by the tag information, and
the converting includes, in a case that the splitting rule is included in the tagging rule corresponding to one or the plurality of the selected service servers identified by the selected service identification information, converting the specific symbol into a splitting symbol for splitting the symbol string used in common by one or the plurality of the selected service servers.

10. The relaying device of claim 8, wherein
types of the tagging rule include an erasing rule by which the symbol string after a specific symbol is erased in a case that the specific symbol is included in a symbol string including a plurality of symbols, the symbol string being indicated by the tag information, and
the converting includes, in a case that the erasing rule is included in the tagging rule corresponding to one or the plurality of selected service servers identified by the selected service identification information, converting the specific symbol into other symbol.

11. A relaying device comprising:
a network interface;
a processor coupled to the network interface; and
a memory configured to store tagging rule information concerning a tagging rule relating to tag information for a plurality of service servers on a network capable of storing at least one tag information in association with stored contents data, the memory stores the tagging rule information in correspondence with each of the plurality of service servers, the memory further storing instructions, when executed by the processor, that cause the relaying device to perform:
  receiving, via the network interface, selected service identification information being for identifying at least one selected service server selected by an image processing device from among the plurality of service servers;

receiving, via the network interface, stored tag information stored by the service server;

determining whether the received stored tag information conforms to the tagging rule;

only when it is determined that the received stored tag information does not conform to the tagging rule corresponding to the selected service server identified by the received selected service identification information,
converting the received stored tag information into converted tag information conforming to the tagging rule corresponding to the selected service server, and;
converting a symbol string, included in the received stored tag information, and
being treated differently by each tagging rule corresponding to each of the plurality of service servers, into a converted symbol string treated identically by the tagging rules corresponding respectively to the plurality of service servers;

transmitting, via the network interface, tag designation screen information to one image processing device from among a plurality of the image processing devices, the tag designation screen information being for displaying a tag designation screen for identifying designated tag information from among the stored tag information and the converted tag information; and transmitting, via the network interface, the designated tag information to the service server in a case that the designated tag information transmitted by the one image processing device is received by the network interface after the tag designation screen information has been transmitted to the one image processing device.

12. An image processing device comprising:
a network interface;
a processor coupled to the network interface; and
a memory configured to store instructions, when executed by the processor, that cause the image processing device to perform:

transmitting, via the network interface to a relaying device via a network, selected service identification information being for identifying at least one selected service server selected by a user from among a plurality of service servers, each of the plurality of service servers being capable of storing at least one tag information in association with uploaded contents data, and the relaying device configured to store tagging rule information concerning a tagging rule relating to the tag information for the plurality of service servers, and transmitting, via the network interface to the relaying device, designated tag information designated by a user;

causing the relaying device to determining whether the transmitted designated tag information conforms to the tagging rule;

when it is determined that the transmitted designated tag information does not conform to the tagging rule corresponding to the selected service server identified by the transmitted selected service identification information,
causing the relaying device to convert the transmitted designated tag information into converted tag information conforming to the tagging rule corresponding to the selected service server, and
causing the relaying device to convert a symbol string, included in the transmitted designated tag information, and being treated differently by each tagging rule corresponding to each of the plurality of service servers, into a converted symbol string treated identically by the tagging rules corresponding respectively to the plurality of service servers; and
causing the relaying device to transmit the converted tag information to the service server.

13. A system comprising an image processing device, a relaying device and a plurality of service servers on a network being capable of storing at least one tag information in association with stored contents data,
the image processing device comprising:
a first network interface; and
a control device coupled to the first network interface,
the relaying device comprising:
a second network interface;
a processor coupled to the second network interface; and
a memory configured to store instructions and tagging rule information, the tagging rule information concerning a tagging rule relating to tag information for each of the service servers, the memory storing the tagging rule information in correspondence with each of the plurality of service servers,
wherein
the control device of the image processing device is configured to perform: transmitting designated tag information to the relaying device via the first network interface,
the instructions, when executed by the processor of the relaying device, cause the relaying device to perform:
receiving, via the second network interface, selected service identification
information being for identifying at least one selected service server selected by the image processing device from among the plurality of service servers;
receiving, via the second network interface, the designated tag information designated by the image processing device;
determining whether the received designated tag information conforms to the tagging rule;
only when it is determined that the received designated tag information does not conform to the tagging rule corresponding to the selected service server identified by the received selected service identification information,
converting the received designated tag information into converted tag information, the converted tag information conforming to the tagging rule corresponding to the selected service server; and
converting a symbol string, included in the received designated tag information, and being treated differently by each tagging rule corresponding to each of the plurality of service servers, into a converted symbol string treated identically by the tagging rules corresponding respectively to the plurality of service servers; and
transmitting, via the second network interface, the converted tag information to the service server.

* * * * *